United States Patent [19]
Krämer

[11] Patent Number: 5,173,326
[45] Date of Patent: Dec. 22, 1992

[54] METHOD AND APPARATUS FOR ELECTROSTATIC COATING OF WORKPIECES WITH POWDERED MATERIAL

[75] Inventor: Erich Krämer, Michelau, Fed. Rep. of Germany

[73] Assignee: Metri Airfluid AG, Altstatten, Switzerland

[21] Appl. No.: 687,394

[22] Filed: Apr. 18, 1991

[30] Foreign Application Priority Data

Apr. 24, 1990 [DE] Fed. Rep. of Germany ....... 4013063

[51] Int. Cl.⁵ .............................. B05D 1/06; B05B 5/03
[52] U.S. Cl. .................................... 427/478; 427/479; 118/312; 118/634
[58] Field of Search .................. 118/634, 312; 427/27, 427/33

[56] References Cited

U.S. PATENT DOCUMENTS

| | | | |
|---|---|---|---|
| 4,288,466 | 9/1981 | Heckman et al. | 427/28 |
| 4,301,764 | 11/1981 | Campion et al. | 118/312 X |
| 4,454,832 | 6/1984 | Gernez | 118/634 |
| 4,824,295 | 4/1989 | Sharpless | 118/634 X |

OTHER PUBLICATIONS

"Webster's Ninth New Collegiate Dictionary," Springfield, Mass., Merriam-Webster Inc., 1986, p. 267.

Primary Examiner—Evan Lawrence
Attorney, Agent, or Firm—Henry M. Feiereisen

[57] ABSTRACT

A method and an apparatus for electrostatic coating of workpieces with powdered material includes a plurality of successively arranged spray guns which are passed by the workpieces. At least the spray gun which is passed first by the workpieces is charged with recycled powder while at least the spray gun which is passed last by the workpieces is charged with fresh powder in form of a powder-air mixture containing a low amount of air and supplied at low velocity.

26 Claims, 8 Drawing Sheets

METHOD AND APPARATUS FOR ELECTROSTATIC COATING OF WORKPIECES WITH POWDERED MATERIAL

BACKGROUND OF THE INVENTION

The present invention refers to a method and apparatus for electrostatic coating of workpieces with powdered material, in particular to a method and apparatus of a type by which the workpieces are advanced through several successively arranged spray guns supplied with a powder-air mixture, with sprayed excessive powder being used for renewed spraying through recycling.

In general, in conventional methods and apparatuses of this type the workpieces are advanced, for example suspended from a chain, through a spray cabin which houses several successive spray guns so that subsequent coatings are applied upon the workpiece which, after passing the last spray gun, has a powder coating of desired thickness. During such treatment, a considerable amount of excess powder i.e. sprayed powder which does not adhere to the workpiece is obtained. This amount of excess powder is immediately discharged from the cabin "continuously" and/or during a paint change and collected in containers for further use (recycling). Although such recycling does reduce powder losses, there are still drawbacks. Even when thoroughly cleansing the cabin during each change of paint, it is still unavoidable, in particular during frequent paint change, that powder particles of paint from a previous coating process are blended into the recycled powder so that a renewed use of the recycled powder results in stains on the surface of the coated workpiece and thus to a diminished surface quality (finish). This is true even if the fraction of foreign paint particles is slight. Proposals to add fresh powder to the recycled excess powder did not resolve this problem because—as set forth above—even smallest amounts of foreign paint particles will mar the finish.

Practice has further shown that during spraying of recycled excess powder, especially when the latter is recycled for several times, those areas of the workpiece which by nature are difficult to coat, such as areas which extend in the electrostatic "field shadow", the coating results remain unsatisfactory. A reason for that could be the enrichment of fiiller particles in the recycled and multiply-used powder, on the one hand, and the high kinetic energy of the paint particles of the powder-air spray stream which exits the spray gun and contains a substantial amount of air.

SUMMARY OF THE INVENTION

It is an object of the present invention to provide an improved method and improved apparatus for electrostatic coating of workpieces with powdered material, obviating the afore-stated drawbacks.

In particular, it is an object of the present invention to provide an improved method and improved apparatus for electrostatic coating of workpieces with powdered material which ensure a superior surface quality without encountering foreign particles and unsatisfactorily coated areas and yet allow a complete and even multiple recycling and reuse of excess powder.

These objects, and others which will become apparent hereinafter are attained in accordance with the present invention by charging at least the spray gun which is passed first by the workpiece with recycled excess powder, and by charging at least the spray gun which is passed last by the workpiece with fresh powder in form of a powder-air mixture which contains a low amount of air and is supplied at low velocity.

According to the teaching of the present invention, the spray gun (or spray guns) reached last by the workpiece is supplied with fresh powder so that the surface of the coating is always free of any foreign paint particles. The degree of contaminations in the subjacent layers of coat is irrelevant which means that the spray gun or spray guns assigned for these lower layers can be supplied with recycled powder, even frequently recycled powder without interfering with the surface finish. In addition, a cleaning of the powder cabin during change of paint is also far less demanding.

Since the spray guns which are assigned for the surface coating are supplied with a powder-air mixture of low air moiety and of low velocity, the kinetic energy of the powder particles is low so that a "powder cloud" is obtained between the spray gun and workpiece, with the powder particles being almost exclusively taken over by the electrostatic field, resulting not only in a high deposition degree but also in a superior coating of areas of the workpiece which are otherwise difficult to reach.

Suitably, the air component of the powder-air mixture fed to the spray guns for finish coating amounts to only a few percent (less than 10%) and the velocity by which the powder-air mixture is supplied to the spray guns only exceeds insignificantly the velocity required for reaching the spray nozzle of the spray gun. It is also advantageous to feed the spray gun for finish coating directly from a original powder container in order to ensure that no foreign particles are carried along. Preferably, the powder withdrawn from the original powder container is screened to eliminate lumps which may form during temperature fluctuations and/or storage.

According to a further feature of the present invention, an apparatus for electrostatic coating of workpieces includes a powder fluidizing and transferring unit which has at least one suction and transport pipe with suction port and immersible from above into the original powder container, fluidizing means for generating a locally limited powder fluid bed within the container, and a strainer basket which surrounds at distance the part of the suction and transport pipe being immersed in the powder fluid bed whereby the air outlet openings of the fluidizing means are arranged laterally outside and/or below the strainer basket.

Through the provision of such a powder fluidizing and transferring unit fresh powder which is free of foreign particles and free of lumps can be supplied from the original powder container to the spray guns for finish coating in form of a powder-air stream which contains a very low fraction of air and is supplied at very low velocity. Certainly, the fluidizing and transferring unit may be usable not only for those spray guns which are assigned for finish coating but also for those spray guns which are charged with recycled powder. However, the recycled powder may also be supplied by other means, such as conventional containers with fluidized bottom.

The number of spray guns which are supplied with fresh powder and recycled powder and are arranged in the spray cabin depends on prevailing conditions of the coating plants and on the workpieces to be coated. Test have shown that very good results are achieved in a coating cabin with eight successively arranged spray guns, with the first four spray guns being charged with recycled powder and the remaining four spray guns being charged with fresh powder. Recycling of the powder can be carried out directly to the respective spray guns or via a intermediate receptacle.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Throughout all the Figures, the same or corresponding elements are always indicated by the same reference numerals.

Figure 1:
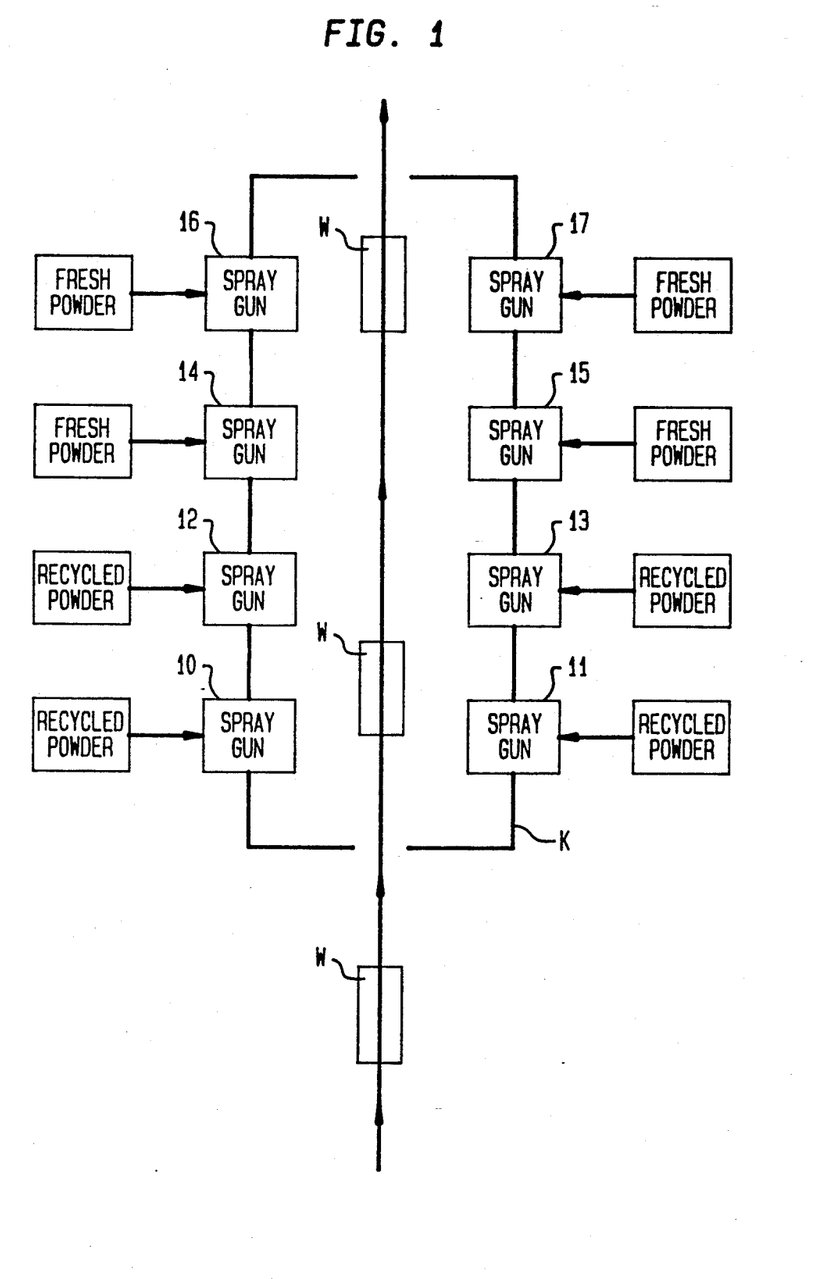
FIG. 1 is a schematic block diagram of an exemplified powder coating cabin with an arrangement of eight spray guns.

Referring now to the drawing, and in particular to FIG. 1, there is shown a schematic block diagram of an exemplified powder coating cabin K which contains an arrangement of eight spray guns indicated by reference numerals 10 to 17, with four spray guns successively lined at each side of the path along which workpieces W are guided through the powder coating cabin K. Since the structure and operation of spray guns are known by persons skilled in the art, a detailed description thereof is omitted for sake of simplicity.

The workpieces W are advanced through the coating cabin K in direction of the arrows by a suitable transport unit such as a transport unit including a chain from which the workpieces are suspended. This transport unit, like other necessary apparatus, is not part of the invention, and has been omitted from the Figures for sake of simplicity.

In the nonlimiting example of FIG. 1, the spray guns 10, 11, 12 and 13 are all charged with recycled powder while the spray guns 14, 15, 16, 17 are supplied with fresh powder. However, this arrangement is made by way of example only, and may be modified as long as at least the spray guns 10 and 11 are charged with recycled powder and at least the spray guns 16 and 17 are charged with fresh powder.

In order to avoid the presence of powder lumps or powder particles of excessive grain size, it is preferred to screen the fresh powder and the recycled powder before being supplied to the respective spray guns because their presence results in an uneven coating of the workpieces W which diminishes the quality especially when considering a finish coating. Formation of such powder lumps or oversized powder particles may be encountered after storing the powder within the original container over a lengthy period or because of temperature fluctuations.

A suitable device for transferring the powder from a container to a spray gun is illustrated in FIGS. 2 to 5.

Figure 2:
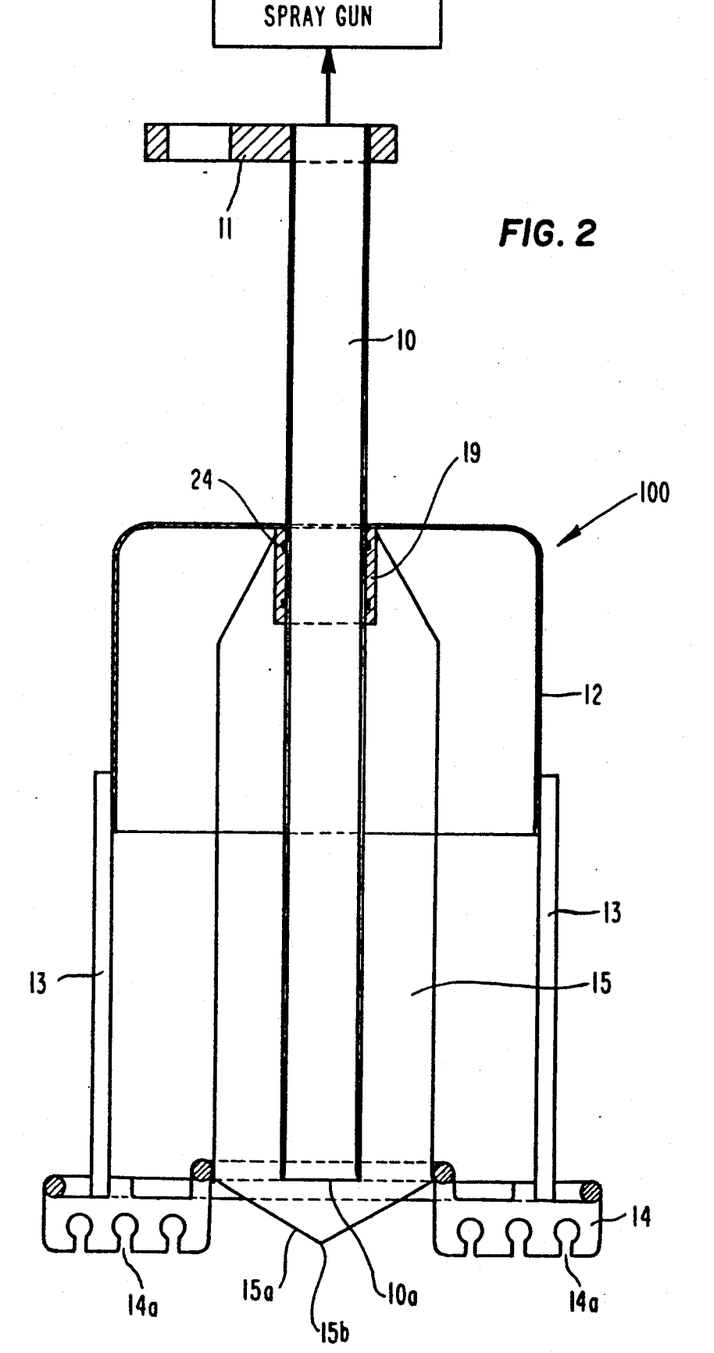
FIG. 2 is a schematic partly sectional view of a powder fluidizing and transferring apparatus operatively connected to a spray gun.
Figure 2A:
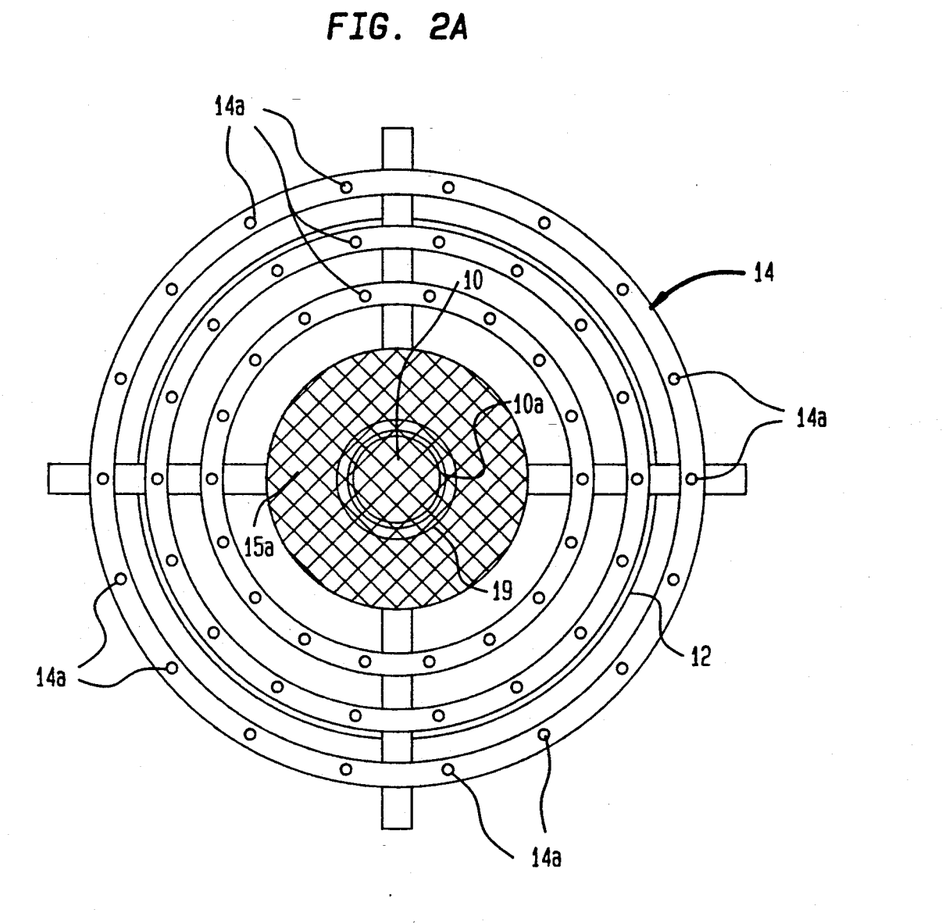
FIG. 2A is a bottom plan view of the powder fluidizing and transferring apparatus of FIG. 2.

Turning first to FIGS. 2 and 2A, there are shown a schematic, partly sectional view and a bottom plan view of an exemplified powder fluidizing and transferring apparatus, generally designated by reference numeral 100. The powder fluidizing and transferring apparatus 100 includes a vertical suction and transport pipe 10, with its lowermost end defining a suction port 10a and with its upper end being mounted in a support plate 11 and suitably connected to a further pipe, preferably a tubing, for direct attachment to the powder spray gun. For sake of simplicity, the tubing and spray gun are only schematically indicated.

Attached to the pipe 10 at a suitable location thereof is a downwardly open bell-shaped body 12 which is centrally traversed by the pipe 10 and carries several vertical compressed air pipes 13 about its outside. Although not shown in detail in the Figures, persons skilled in the art will recognize that the compressed air pipes 13 are suitably connected at its upper end to a source of compressed air e.g. via a tubing. The lower end of the compressed air pipes 13 is connected to fluidizing rings 14 which extend concentric to each other and are provided with downwardly facing air outlet openings or perforations 14a for allowing compressed air to exit. It will be readily recognized that it is certainly sufficient to assign one pipe 13 for connection with the compressed air source, with the other pipes 13 merely serving for support of the fluidizing rings 14. Alternatively, the upper ends of the pipes 13 may be commonly connected by an annular pipe which suitably communicates with the source of compressed air.

Surrounding the pipe 10 at a distance thereto is an essentially cylindrical screening or strainer basket 15 which is mounted to the pipe 10 at its upper converging ends via a collar 19 which is suitably sealed by O-rings 24 and bears against the underside of the bell-shaped body 12. The lower end of the strainer basket 15 is spaced from the suction port 10a of the pipe 10 and is configured in form of a flat cone 15a with downwardly facing apex 15b. As clearly shown in FIGS. 2 and 2A, the strainer basket 15 is arranged in such a manner that the air outlet openings 14a are located laterally outside the strainer basket 15 at a level below the apex 15b of the cone 15a.

Figure 3:
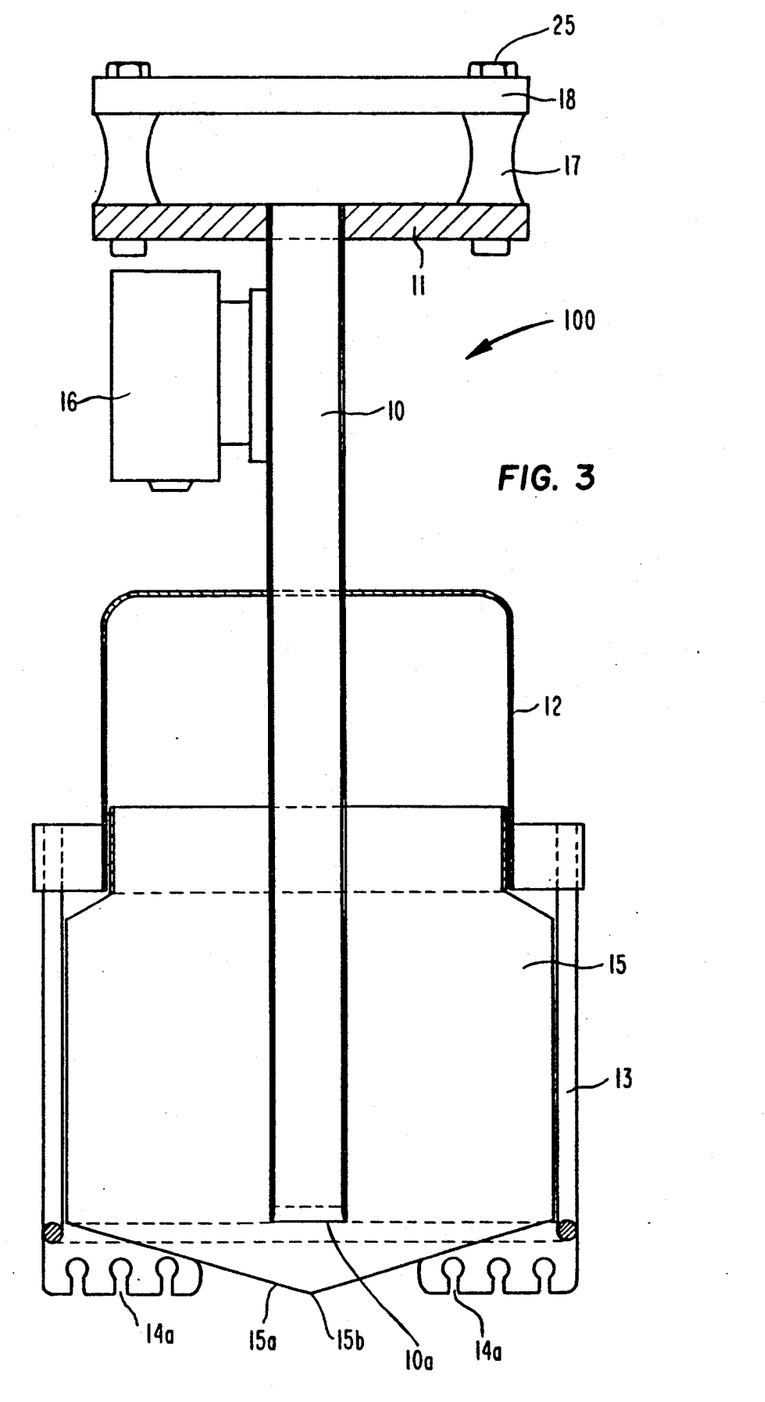
FIG. 3 is a schematic, partly sectional view of another embodiment of a powder fluidizing and transferring apparatus operatively connectable to a spray gun.

FIG. 3 shows a modification of the powder fluidizing and transferring apparatus 100 which differs from FIG. 2 in the design of the strainer basket 15 which is now of increased diameter so as to define a considerably larger interior space and is mounted with its upper end to the bell-shaped body 12. The air outlet openings 14a of the fluidizing rings 14 for allowing compressed air to exit are flush or in a line with the apex 15b of the cone 15a and extend below the marginal perimeter area of the strainer basket 15.

The provision of such a large diameter or interior space is especially suited when demanding a very fine-meshed strainer basket as will be explained in more detail furtherbelow.

The powder fluidizing and transferring apparatus 100 in accordance with FIG. 3 further includes a vibrator 16 which is mounted to the pipe 10 above the bell-shaped body 12. In order to prevent propagation of oscillations, the support plate 11, which centrally retains the pipe 10, is connected via a vibration absorbing padding or buffer 17 with a second support plate 18 and secured by suitable bolts 25. In this case, the support plate 18 may be connected with the support arm of a not shown lifting device or may also be the support arm itself.

Persons skilled in the art will appreciate that although the vibrator 16 is shown only in FIG. 3, the powder fluidizing and transferring apparatus according to FIG. 2 may certainly also be equipped with such a vibrator.

Figure 4:
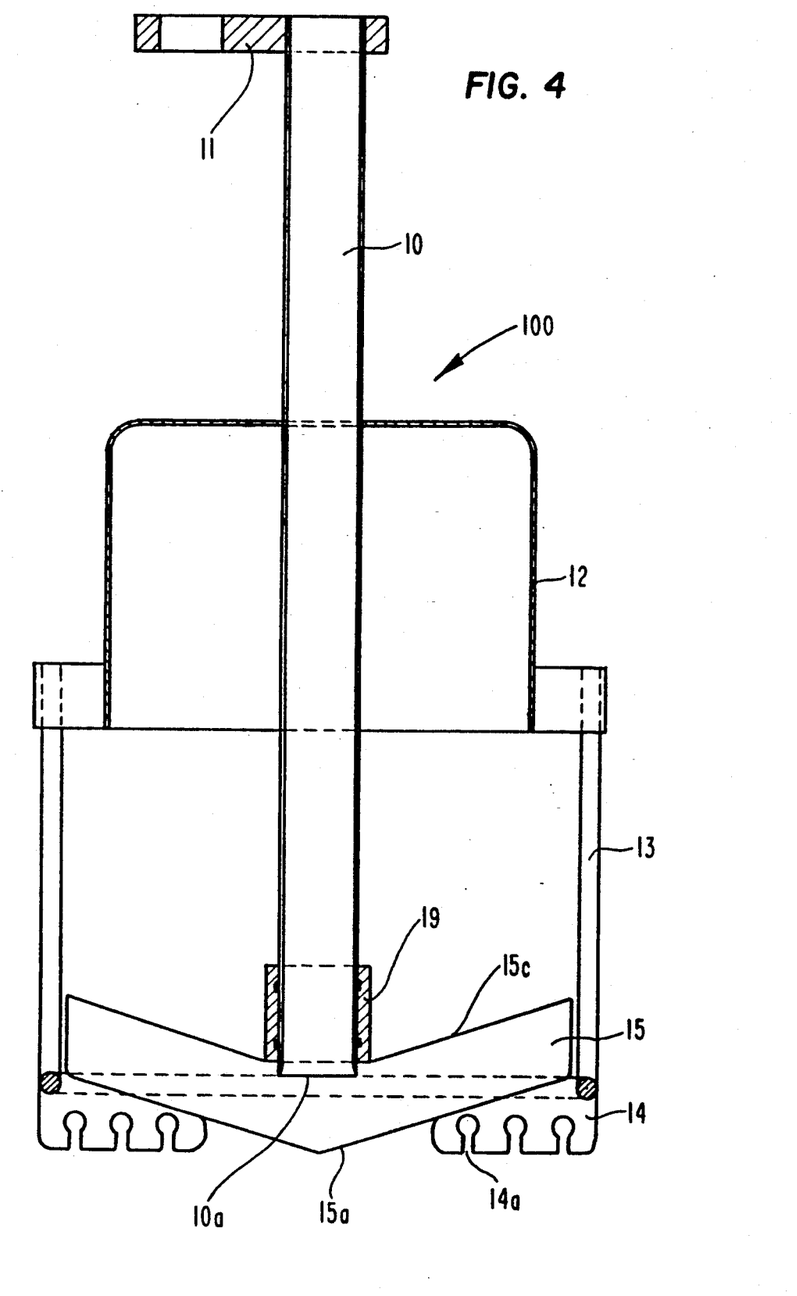
FIG. 4 is a schematic, partly sectional view of still another embodiment of a powder fluidizing and transferring apparatus operatively connectable to a spray gun.

FIG. 4 shows another modification of the powder fluidizing and transferring apparatus 100, with a strainer basket which is now configured in form of a flat cylinder with conical end face 15a and conical top 15c. The top 15c is attached to the pipe 10 via a suitably sealed collar 19 in proximity of the suction port 10a. The diameter of the strainer basket 15 corresponds essentially to the strainer basket as shown in FIG. 3, with the fluidizing rings 14 extending below the lateral margins of the strainer basket 15. The strainer basket 15 according to FIG. 4 is especially suited for penetration into the powdered material.

Figure 5:
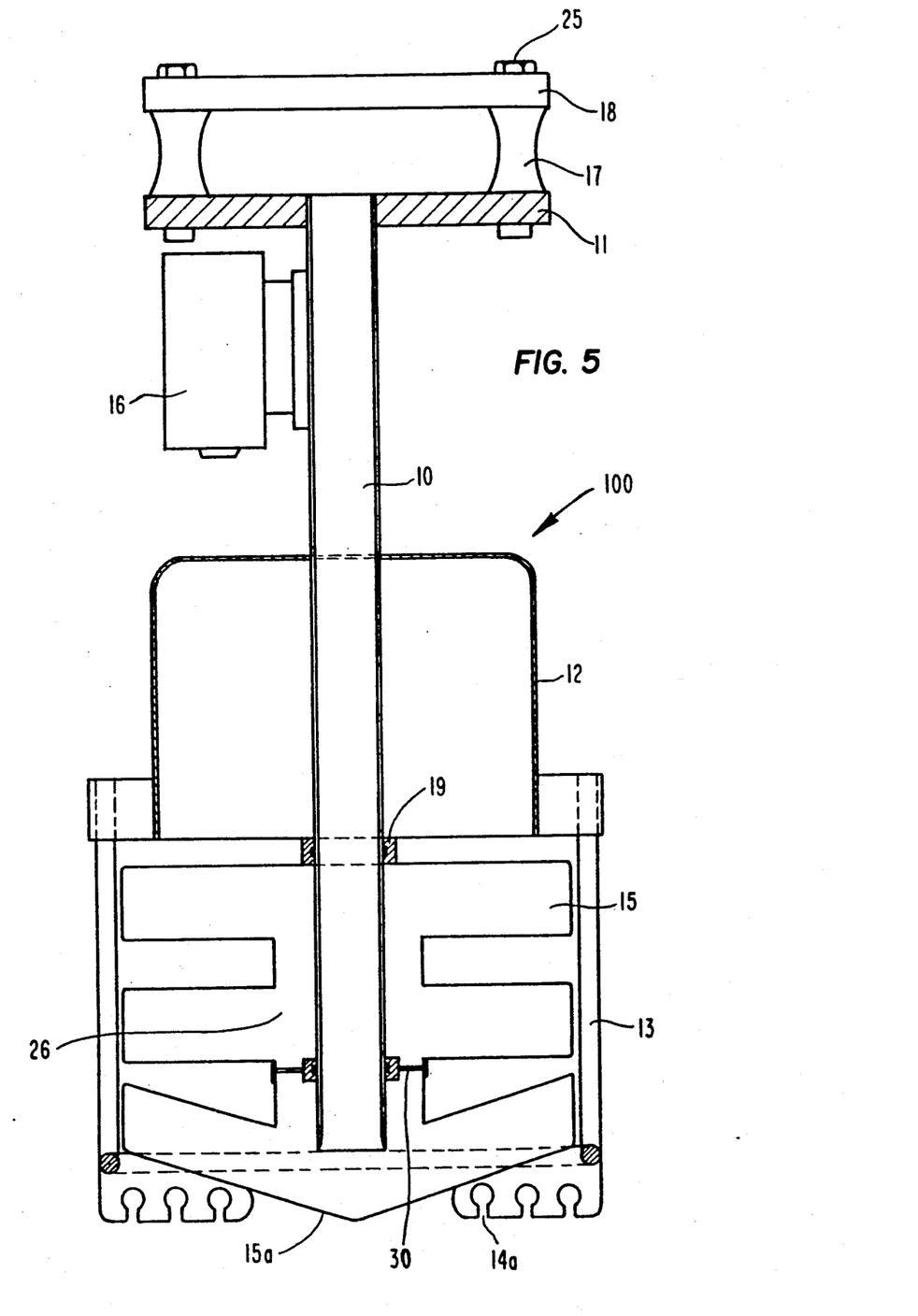
FIG. 5 is a schematic, partly sectional view of yet another embodiment of a powder fluidizing and transferring apparatus operatively connectable to a spray gun.

In FIG. 5, the strainer basket 15 is characterized by an especially great surface area and configured in form of several "ribs" to resemble the shape of a ribbed radiator. The individual ribs are connected to each other at the rib base 26 which surrounds the pipe 10. The strainer basket 15 according to FIG. 5 is attached to the pipe 10 at its top by the suitably sealed collar 19 and at a lower area via a support 30 in form of lugs so that a passage of powdered material to the area about the pipe 10 is ensured.

It will be appreciated by persons skilled in the art that selection of shape and size of the strainer basket is dependant on various conditions and demands. As set forth above, the mesh may be finer with increasing surface area of the strainer basket. For that reason, designs with great surface area, such as e.g. the shape of the strainer basket according to FIG. 5 are very advantageous. There are circumstances, however, which make it unsuitable to render the strainer basket with great dimensions, e.g. when employing the fluidizing and transferring apparatus for conveying powdered material from small containers. Thus, various factors enter the selection of a suitable design for the strainer basket.

The operation of the powder fluidizing and transferring apparatus 100 as shown in FIG. 2 to 5 will now be described with reference to FIG. 6.

At operation, the powder fluidizing and transferring apparatus 100 is introduced into the powdered material 21 through the open top of the respective container 20. Compressed air exiting through the air outlet openings 14a of the fluidizing rings 14 causes a locally limited (partial) fluidization of the powder about the immersed part of the powder fluidizing and transferring apparatus 100 so that the fluidized powder flows through the strainer basket 15 toward the suction port 10a and is upwardly transported within the pipe 10. By means of vibrator 16, the strainer basket 15 is caused to vibrate to thereby enhance immersion of the strainer basket 15 into the powdered material 21 and the permeability of the strainer basket 15.

Suitably, a further vibrator 22 is mounted to the exterior of the powder container 20 which thus is placed on vibration absorbing footing 23 to prevent oscillations from propagating. The vibrator 22 causes vibrations of the powdered material 21 to thereby force powder, which is not yet fluidized, especially powder along the lateral perimeter of the powder container (crater edge), to flow to the fluidizing area about the immersed part of the apparatus 100. With increasing powder aspiration, the powder fluidizing and transferring apparatus 100 progressively and automatically lowers itself within the powder container 20.

Operational details and advantages of the unit comprised of the suction and transport pipe 10, compressed air pipe 13 and the fluidizing rings 14 are generally known by persons skilled in the art so that a further description thereof is not necessary.

As set forth above, the strainer basket 15 is spaced from and encloses the lower part of the pipe 10 and the suction port 10a because only then is a clogging of the screen texture avoided. The more fine-meshed the texture of the screen, the greater the dimension of the strainer basket. In case of a medium fine texture, the dimensions of the strainer basket as shown in FIG. 2 may be sufficient; on the other hand, in case of a very fine meshed texture, the strainer basket should be preferably dimensioned in accordance with the embodiment of FIG. 3.

It should be further noted that the location of the air outlet openings 14a of the fluidizing rings 14 relative to the strainer basket 14 should be selected such that the air outlet openings 14a are not disposed within the strainer basket 15 but outside thereof at a level either flush with the lowermost point, i.e. the apex, of the strainer basket as shown in FIG. 3 or immediately therebelow as shown in FIG. 2.

When using a strainer basket with small diameter such as the strainer basket 15 according to FIG. 2, the air outlet openings 14a may be arranged laterally of the strainer basket 15. In the event, however, the strainer basket is of considerable diameter such as the strainer basket 15 according to FIG. 3, it is preferred to arrange the air outlet openings 14a below the marginal perimeter of the strainer basket 15 because an exclusive lateral arrangement of the air outlet openings would result in an unsatisfactory powder fluidization underneath the suction port 10a. By sufficiently dimensioning the strainer basket 15 and suitably arranging the fluidizing rings 14 relative to the strainer basket 15, a clogging of the strainer basket 15 is avoided even over a long operational period.

As set forth above, penetration of powder into the strainer basket 15 can be facilitated by vibrating the strainer basket 15 e.g. by means of vibrator 16 as indicated in FIG. 3. It is not necessary to provide great exciting energies; however, it may be suitable to provide the vibration all-around i.e. there is no predetermined and preferred vibrational direction. This ensures even more a prevention of cloggings of the strainer basket.

Figure 6:
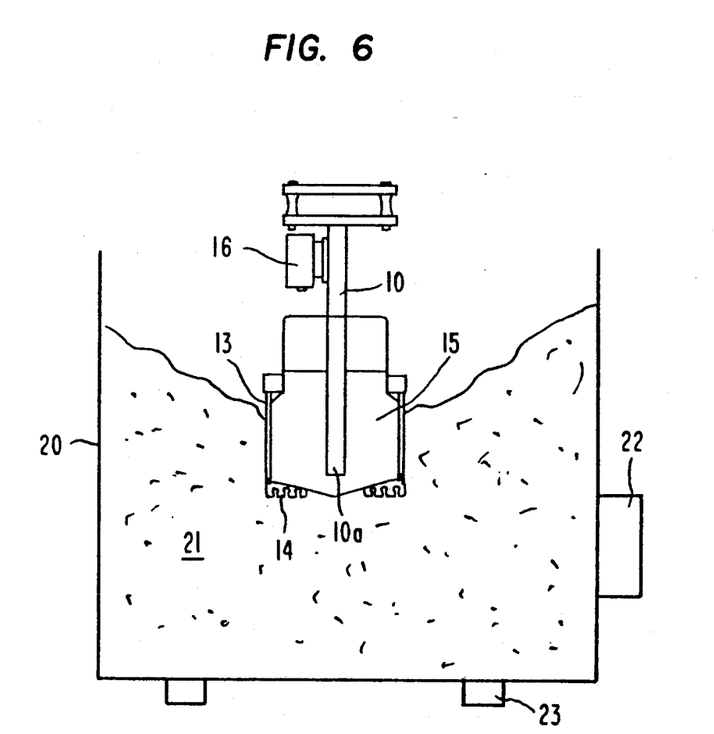
FIG. 6 is a schematic illustration, on a reduced scale, of the powder fluidizing and transferring apparatus of FIG. 3 in operation within a powder container.

As previously mentioned, the vibrator 22 which is shown in FIG. 6 oscillates the powder container 20 with the powdered material 21 to ensure that formation of agglomerations of powder along the marginal perimeter of the container 20 is collapsed to thereby allow feeding of powder also from these areas to the fluidizing region. Extensive tests have shown, however, that in contrast to the desired all-around vibration of the strainer basket 15, an all-around vibration of the powdered material 21 by the vibrator 22 is less desirable as segregation and/or solidification of the powdered material may be encountered because of vertical vibrations. Therefore, it is preferred to operate vibrator 22 in such a manner that the powdered material 21 oscillates only in horizontal direction to ensure a supply of powdered material from the marginal areas towards the fluidizing area without encountering solidifications or segregations.

It has been further shown that interferences can be avoided when vibrating or oscillating the strainer basket 15 and the powdered material 21 at different frequencies. For example, vibrator 22 may oscillate the powdered material 21 at a frequency of 50 Hz while vibrator 16 oscillates the strainer basket 15 at a frequency of e.g. 60 Hz.

Persons skilled in the art will recognize that the vibrators 16 and 22 may be attached also at different locations to attain the desired results. As illustrated in FIG. 3, the vibrator 16 is mounted to the pipe 10 in order to cause vibrations of the entire unit comprised of pipe 10, compressed air pipes 13, fluidizing rings 14 and strainer basket 15. However, it is certainly feasible to vibrate solely the strainer basket by directly mounting the vibrator 16 thereto and by attaching the strainer basket to the pipe via a suitable vibration absorbing padding. The vibrator 22 may be mounted directly to the powder container 20 as shown in FIG. 6 but may certainly be attached also to a receptacle in which the powder container 20 is inserted or to a vibration table which supports the powder container 20.

Figure 7:
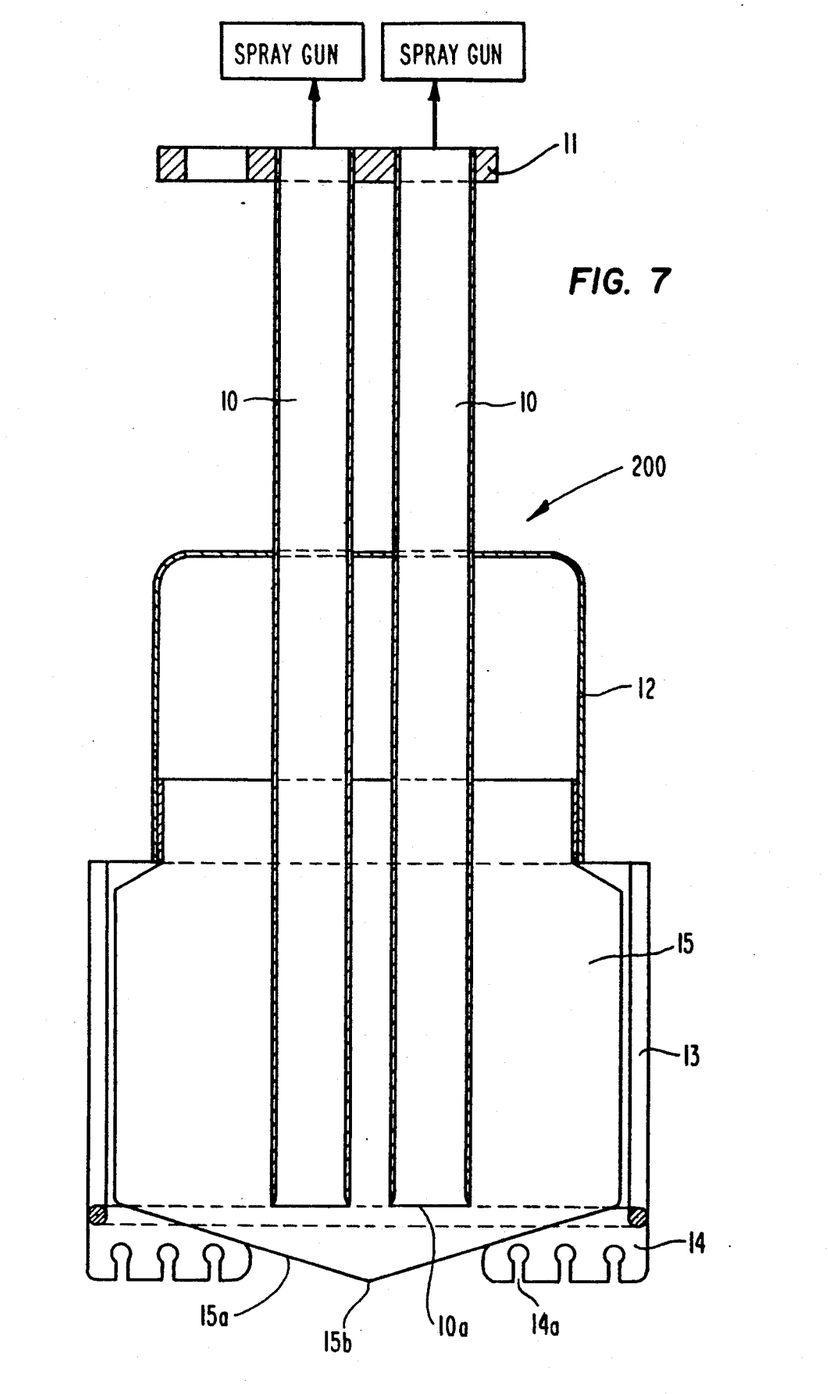
FIG. 7 is a schematic, partly sectional view of an exemplified fluidizing and transferring apparatus with two suction and transport pipes for supply of powder to two spray guns.

At times, it is desired to make available a powder fluidizing and transferring apparatus which includes more than one suction and transport pipes for feeding several powder spray guns. Although it may be feasible to provide each of the pipes with a separate strainer basket, such proposal has been proven unsatisfactory especially in those cases in which the pipes are too closely spaced from each other. Therefore, the arrangement of one single strainer basket which surrounds all pipes has been found advantageous. One such example is shown in FIG. 7 which shows a powder fluidizing and transferring apparatus 200 with two parallel pipes 10, with each upper end being retained in the support plate 11 and suitably connected to a spray gun. The strainer basket 15 corresponds essentially to the strainer basket 15 of FIG. 3 and encloses both pipes 10 at a distance thereto. Depending on circumstances and requirements, it is certainly possible to provide the powder fluidizing and transferring apparatus with any of the other strainer baskets shown in FIGS. 2, 4 and 5 in order to enclose the pipes 10 in accordance with FIG. 7.

It will be appreciated by persons skilled in the art that the entire arrangement of fluidizing and transferring apparatus and spray guns may contain additional elements which do not appear in the foregoing figures. For example, in order to allow each spray gun to be individually supplied with powder, the connection of each pipe 10 to the pertaining spray gun may be controlled by a suitable control and valve mechanism. Also, the suction and transport pipe may be part of a pump or an injector in order to allow withdrawal of the powder from the container and transport to the spray gun. However, these elements, like other necessary elements, are not part of the invention, and have been omitted from the Figures for the sake of simplicity.

Apart from possible modifications of the shape, size and arrangement of the strainer basket and the arrangement of the vibrators, it is also possible to separate the suction and transport pipe 10 from the unit comprised of strainer basket 15 and fluidizing unit 13, 14, 14a. In this case, this unit can be introduced into the powdered material first and subsequently the pipe or pipes 10 may then be separately inserted.

While the invention has been illustrated and described as embodied in a method of and apparatus for electrostatic coating of workpieces with powdered material, it is not intended to be limited to the details shown since various modifications and structural changes may be made without departing in any way from the spirit of the present invention.

What is claimed as new and desired to be protected by Letters Patent is set forth in the appended claims:

I claim:

1. A method of electrostatic coating a workpiece with powdered material comprising the steps of:
   advancing the workpiece past a plurality of successively arranged spray guns;
   charging at least the one of said spray guns which is passed first by the workpiece with recycled excess powder; and
   charging at least the one of said spray guns which is passed last by the workpiece with fresh powder in the form of a powder-air mixture containing a low amount of air and supplied at low velocity.

2. A method as defined in claim 1 wherein said second named charging step includes screening the fresh powder and removing lumps before charging said spray gun.

3. A method as defined in claim 1 wherein said second named charging step includes supplying the powder-air mixture with an air component of less than 10% and at a velocity which slightly exceeds the velocity required for transfer of the powder-air mixture to the spray nozzle of the spray gun.

4. A method as defined in claim 1 wherein said first and second charging steps are carried out with an equal number of spray guns.

5. Apparatus for electrostatic coating a workpiece with powdered material, comprising:
   a plurality of successively arranged spray guns; and
   charging means for feeding said spray guns with a powder-air mixture, said charging means including a first charge unit for supplying at least said spray gun which is passed first by the workpiece with recycled excess powder, and a second charge unit for supplying at least said spray gun which is passed last by said workpiece with fresh powder in the form of a powder-air mixture containing a low amount of air and supplied at low velocity.

6. Apparatus as defined in claim 5 wherein the number of spray guns which are passed first by the workpiece and are charged with recycled powder equals the number of spray guns which are passed last by the workpiece and are charged with fresh powder.

7. Apparatus as defined in claim 6 wherein a total of eight spray guns are provided.

8. Apparatus as defined in claim 5 wherein said charging means includes at least one suction and transport pipe immersible from above into the container and having a suction port, fluidizing means for generating a locally limited powder fluid bed within the container, said fluidizing means including a compressed air pipe provided with air outlet openings, and screening means enclosing the immersing portion of said pipe and its suction port at a distance thereto, with said air outlet openings being arranged outside said screening means.

9. Apparatus as defined in claim 8 wherein said fluidizing means includes a compressed air pipe provided with air outlet openings, said air outlet openings being arranged laterally outside of said screening means.

10. Apparatus as defined in claim 8 wherein said fluidizing means includes a compressed air pipe provided with air outlet openings, said air outlet openings being arranged below said screening means.

11. Apparatus as defined in claim 8 wherein said fluidizing means includes a compressed air pipe provided with air outlet openings, said air outlet openings being arranged laterally outside of and below said screening means.

12. Apparatus as defined in claim 8, and further comprising first vibrating means for causing oscillations of said screening means.

13. Apparatus as defined in claim 8, and further comprising fastening means for mounting said screening means to said suction and transport pipe.

14. Apparatus as defined in claim 8 wherein said suction and transport pipe, said fluidizing means and said screening means are an integral unit.

15. Apparatus as defined in claim 8 wherein said screening means is a cylindrical strainer basket with conical base, with its apex facing downwardly.

16. Apparatus as defined in claim 8 wherein said screening means is a strainer basket with rugged surface area.

17. Apparatus as defined in claim 16 wherein said strainer basket is ribbed.

18. Apparatus as defined in claim 8 wherein said screening means includes a strainer basket with suitable mesh, said strainer basket having a volume which is in inverse ratio to the fineness of said mesh.

19. Apparatus as defined in claim 12, and further comprising attenuation means for absorbing vibrations generated by said first vibrating means.

20. Apparatus as defined in claim 8, including a plurality of parallel suction and transport pipes, said screening means including one single strainer basket surrounding said plurality of suction and transport pipes.

21. Apparatus as defined in claim 8, and further comprising second vibrating means for causing horizontal oscillations of the powdered material.

22. Apparatus as defined in claim 12, and further comprising second vibrating means for causing horizontal oscillations of the powdered material at a suitable oscillating frequency, said first vibrating means oscillating said screening means at a frequency which differs from the oscillating frequency of said second vibrating means.

23. Apparatus as defined in claim 15 wherein said fluidizing means includes a compressed air pipe provided with air outlet openings, said apex of said conical base extending flush with said air outlet openings.

24. Apparatus as defined in claim 13 wherein said fluidizing means includes a compressed air pipe provided with air outlet openings which extend below said apex of said conical base.

25. Apparatus for electrostatic coating a workpiece with a powdered material provided in a container comprising;

a plurality of successively arranged spray guns; and
charging means for feeding said spray guns with a powder-air mixture, said charging means including a charge unit for supplying at least said spray gun which is passed last by said workpiece with fresh powder in form of a powder-air mixture containing a low amount of air and supplied at low velocity, said charging means including at least one suction and transport pipe immersible from above into the container and having a suction port, fluidizing means for generating a locally limited powder fluid bed within the container, said fluidizing means including a compressed air pipe provided with air outlet openings, and powder screening means enclosing the immersing portion of said pipe and its suction port at a distance thereto, with said air outlet openings being arranged outside said screening means.

26. Apparatus for electrostatic coating a workpiece with powdered material comprising:

a plurality of successively arranged spray guns; and
charging means for feeding said spray guns with a powder-air mixture, said charging means including a first charge unit for supplying at least said spray gun which is passed first by the workpiece with recycled excess powder, and a second charge unit for supplying at least said spray gun which is passed last by said workpiece with fresh powder in the form of a powder-air mixture containing a low amount of air and supplied at low velocity, said charging means including a suction and transport pipe adapted for introduction into the container and having a lower end defining a suction port, fluidizing means for generating a powder fluid bed within the container about said suction port for allowing withdrawal of powdered material, and screening means enclosing a suitable portion of said pipe and said suction port at a distance thereto for allowing supply of screened powdered material to the processing device.

* * * * *